(12) United States Patent
Chen

(10) Patent No.: US 8,657,318 B2
(45) Date of Patent: Feb. 25, 2014

(54) VEHICLE RUNNING BOARD

(76) Inventor: Shu-Ying Chen, Tainan (TW)

( * ) Notice: Subject to any disclaimer, the term of this patent is extended or adjusted under 35 U.S.C. 154(b) by 88 days.

(21) Appl. No.: 13/558,363

(22) Filed: Jul. 26, 2012

(65) Prior Publication Data

US 2014/0027996 A1 Jan. 30, 2014

(51) Int. Cl.
*B60R 3/00* (2006.01)

(52) U.S. Cl.
USPC ......................................................... 280/163

(58) Field of Classification Search
USPC ............... 280/163, 727, 166, 164.1, 762, 169
See application file for complete search history.

(56) References Cited

U.S. PATENT DOCUMENTS

| | | | | |
|---|---|---|---|---|
| 4,257,620 A * | 3/1981 | Okland | ....................... | 280/164.1 |
| 4,451,063 A * | 5/1984 | Snyder | .......................... | 280/163 |
| 4,456,275 A * | 6/1984 | Snyder et al. | ................. | 280/163 |
| 5,382,035 A * | 1/1995 | Waddington et al. | ......... | 280/169 |
| 6,203,040 B1 * | 3/2001 | Hutchins | ....................... | 280/169 |
| 7,334,807 B2 * | 2/2008 | Mulder et al. | ................. | 280/163 |
| 7,380,806 B2 * | 6/2008 | Mulder | .......................... | 280/163 |
| 8,002,299 B2 * | 8/2011 | Huang-Tsai | ................... | 280/169 |
| 8,016,309 B2 * | 9/2011 | Flajnik et al. | .................. | 280/169 |
| 8,152,187 B1 * | 4/2012 | Crandall | ....................... | 280/163 |
| 8,403,348 B1 * | 3/2013 | Wang | ............................. | 280/163 |
| 8,596,662 B2 * | 12/2013 | Huang-Tsai | ................... | 280/163 |
| 2005/0012295 A1 * | 1/2005 | Chevalier et al. | ............. | 280/163 |

* cited by examiner

*Primary Examiner* — J. Allen Shriver, II
*Assistant Examiner* — James M Dolak

(57) ABSTRACT

A vehicle running board includes a treadle body provided with a receiving surface with plural recesses and having its underside disposed with a recessed chamber. A decorative plate is mounted on the receiving surface of the treadle body, and an anti-skid pad is set on the decorative plate. A connecting base is received in the recessed chamber of the treadle body and has two lower sides respectively bent inward to form a sliding rail. A plurality of inverted-U shaped positioning members are positioned at the underside of the connecting base, respectively having two sides received in the sliding rails of the connecting base and respectively bored with a long insert hole having a third screw inserted therein. Thus, the positioning members in the connecting base can be adjusted in setting position for matching vehicles of different styles, convenient in assembly and use and stable in whole structure.

2 Claims, 7 Drawing Sheets

VEHICLE RUNNING BOARD

FIELD OF THE INVENTION

This invention relates to a vehicle running board, particularly to one adjustable in setting position for matching various styles of vehicles of different sizes, facilitating to be assembled and used and having firm structure and great practicability.

DESCRIPTION OF THE PRIOR ART

A sport utility vehicle or a vehicle with a comparatively high chassis is generally provided with a running board 10 at two sides of the vehicle body 1 for facilitating passengers to get in or off the vehicle. A conventional vehicle running board 10, referring to FIGS. 1 and 2, includes a tubular treadle body 11 having a bottom side bored with a plurality of threaded holes 110, a topside fixed with an anti-skid pad 12 and two sides respectively mounted with a protective cover 13. The treadle body 11 is secured on a connecting base 15 by bolts 14, and the connecting base 15 to be firmly fixed at one side of the vehicle body 1 is bored with plural insert holes 150 at locations corresponding with the threaded holes 110 of the treadle body 11. When the conventional tubular treadle body 11 is to be assembled on the connecting base 15, the threaded holes 110 at the bottom of the treadle body 11 must be respectively aligned to the insert holes 150 of the connecting base 15. However, since vehicles of various styles are not the same in size, and the positions for setting the connecting base 15 are also different from each other; therefore, the locations of the threaded holes 110 of the treadle body 11 must be adjusted for matching stationary positions of the connecting base 15 on different-styled vehicles. Unfortunately, the fixed connection structure of the conventional treadle body 11 cannot be adjusted for matching with the stationary setting position of the connecting base 15 that is secured on the vehicle body 1, rendering inconvenience in assembly and use.

SUMMARY OF THE INVENTION

The objective of this invention is to offer a vehicle running board that is adjustable in setting position for matching with vehicles of different styles, convenient in assembly and use and stable in the whole structure.

The vehicle running board in the present invention includes a treadle body formed with a receiving surface provided thereon with a plurality of positioning recesses, which are respectively bored with a first threaded hole. The treadle body has an underside disposed with a recessed chamber with a plurality of second threaded holes. A decorative plate to be mounted on the receiving surface of the treadle body is composed of a long decorative plate and a short decorative plate jointed together and respectively formed with a plurality of recesses respectively bored therein with an insert hole, with plural first screws respectively inserted through the insert holes of the decorative plate and screwed in the first threaded holes of the treadle body. The decorative plate further has an underside provided with plural positioning projections at locations corresponding with the recesses to be respectively engaged in the positioning recesses of the treadle body. An anti-skid pad is set on the decorative plate, and a connecting base is received in the recessed chamber at the underside of the treadle body. The connecting base is bored with a plurality of insert holes at locations corresponding with the second threaded holes in the recessed chamber at the underside of the treadle body, and the insert holes are respectively inserted therein with a second screw to be screwed in the second threaded hole of the treadle body.

The feature of this invention is that the connecting base has two lower sides respectively formed into a sliding rail, and plural inverted-U shaped positioning members are disposed at the underside of the connecting base and have two sides respectively received in the sliding rails of the connecting base. Each positioning member is formed with a long insert hole having third screws inserted therein.

In addition, the lower side of the screw head of the third screw on the positioning member is square-shaped; therefore, when received in the long insert hole of the positioning member, the third screw will be impossible to be turned around to enable nuts to be conveniently locked with the third screw.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
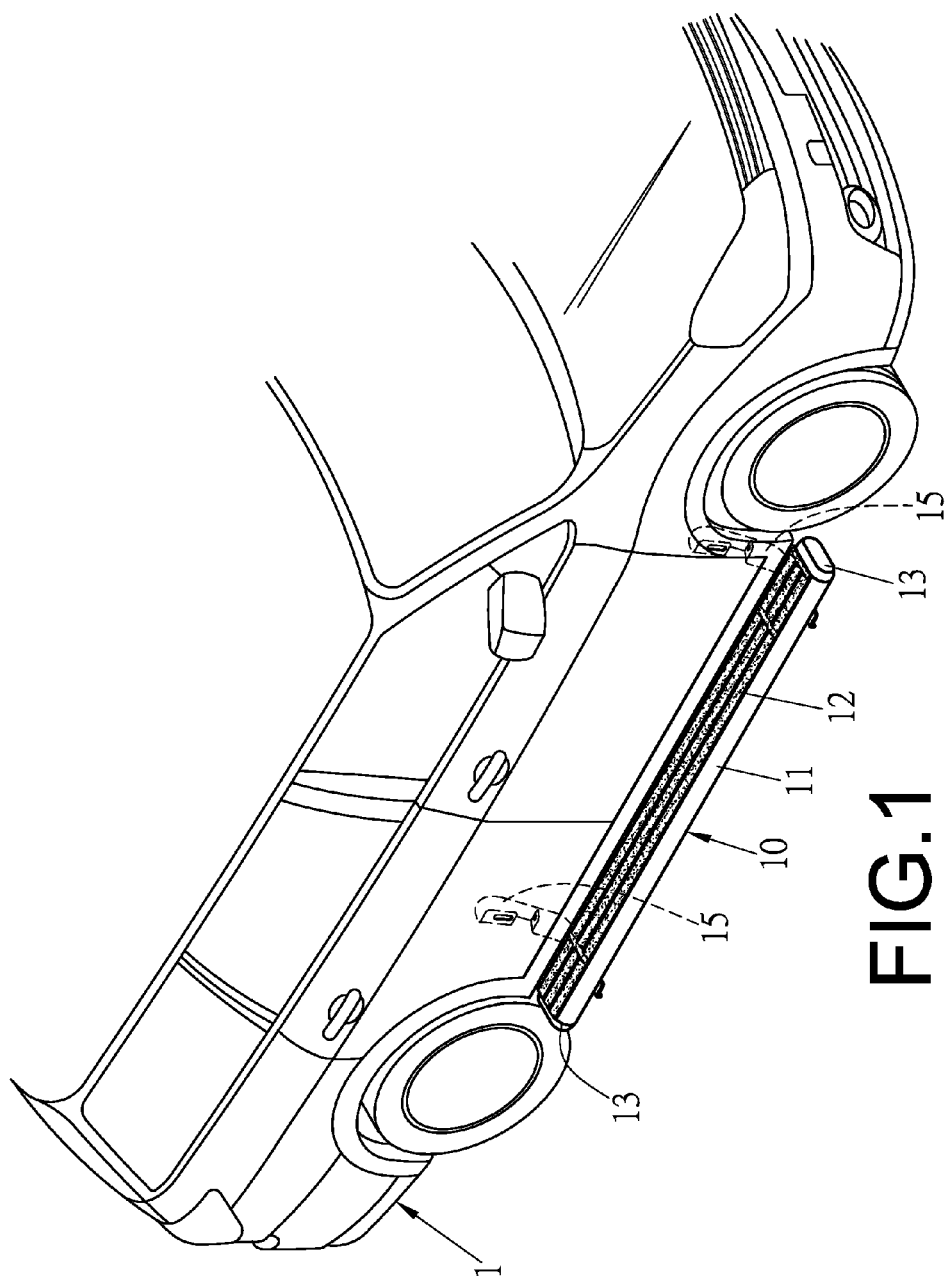
FIG. 1 is a diagrammatical view of a conventional vehicle running board assembled on a vehicle.
Figure 2:
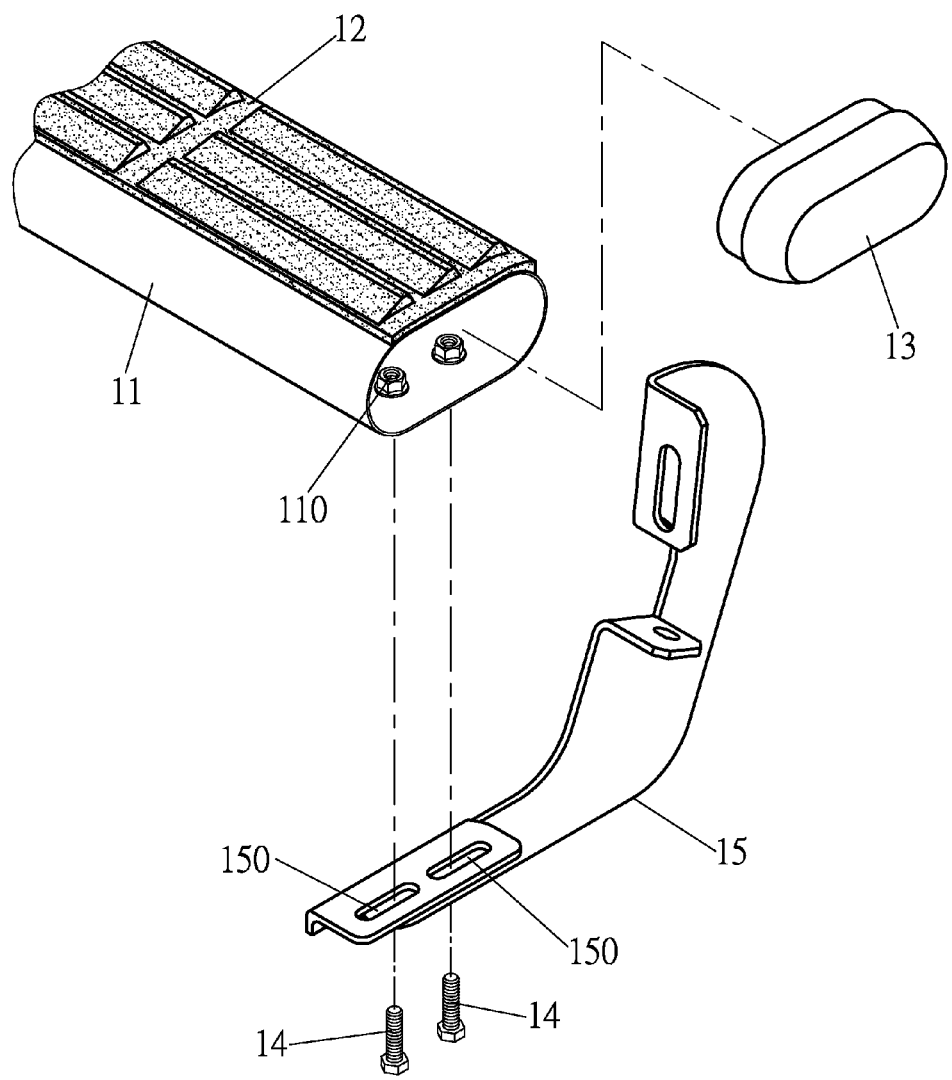
FIG. 2 is an exploded perspective view of the conventional vehicle running board.
Figure 3:
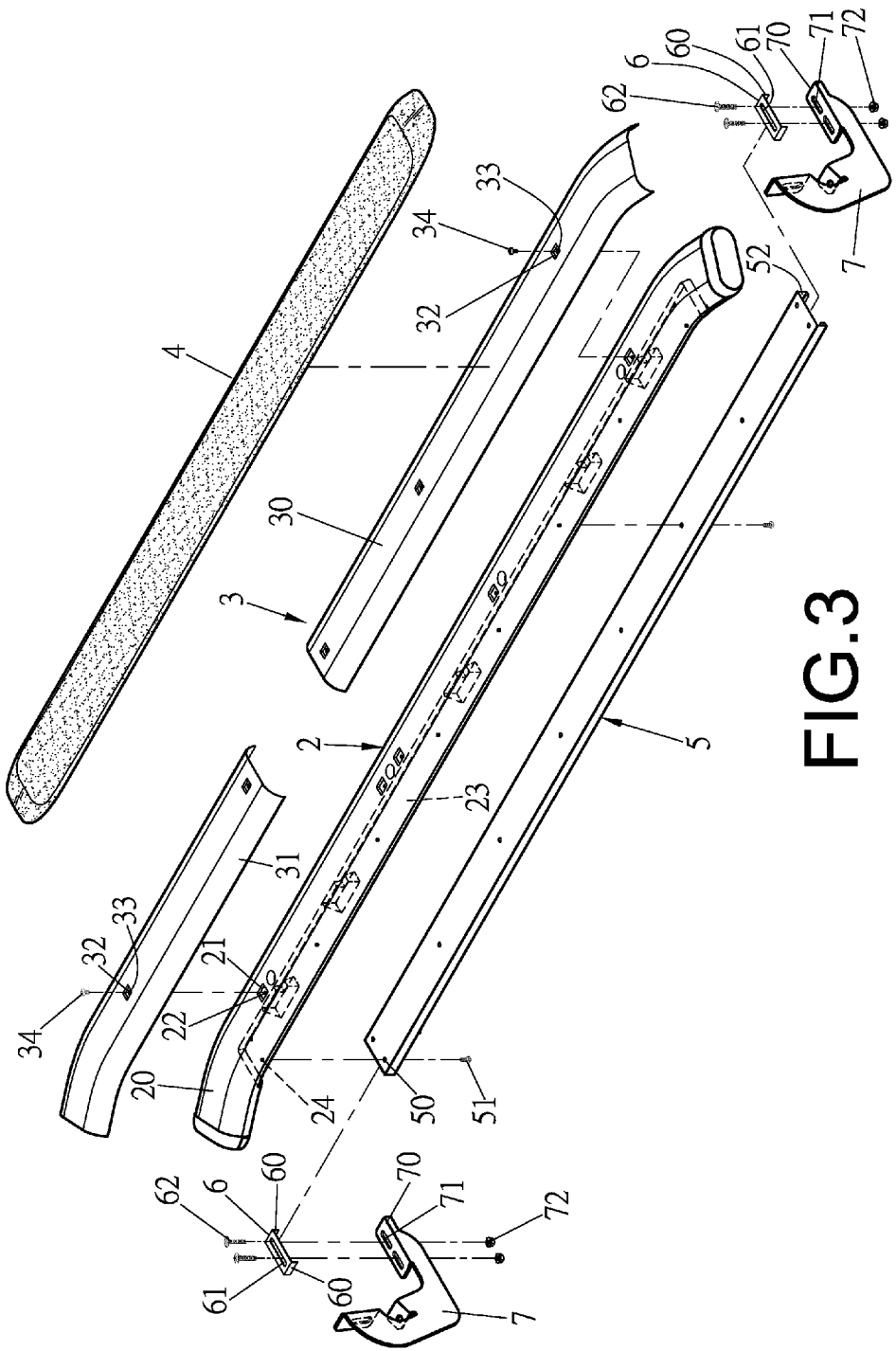
FIG. 3 is an exploded perspective view of a vehicle running board in the present invention.
Figure 4:
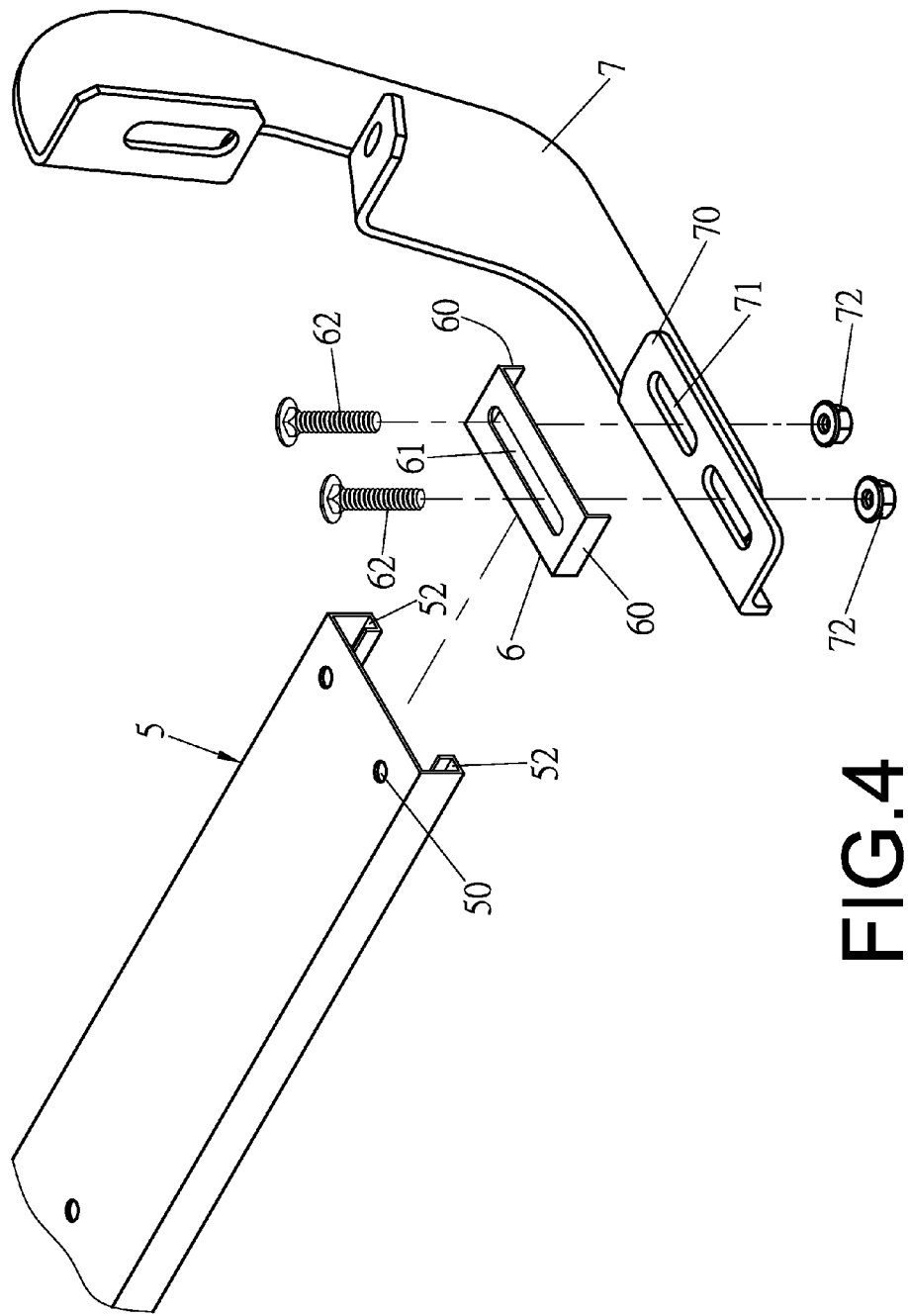
FIG. 4 is a partial exploded perspective view of a connecting base, a positioning member and a fixing base in the present invention.
Figure 5:
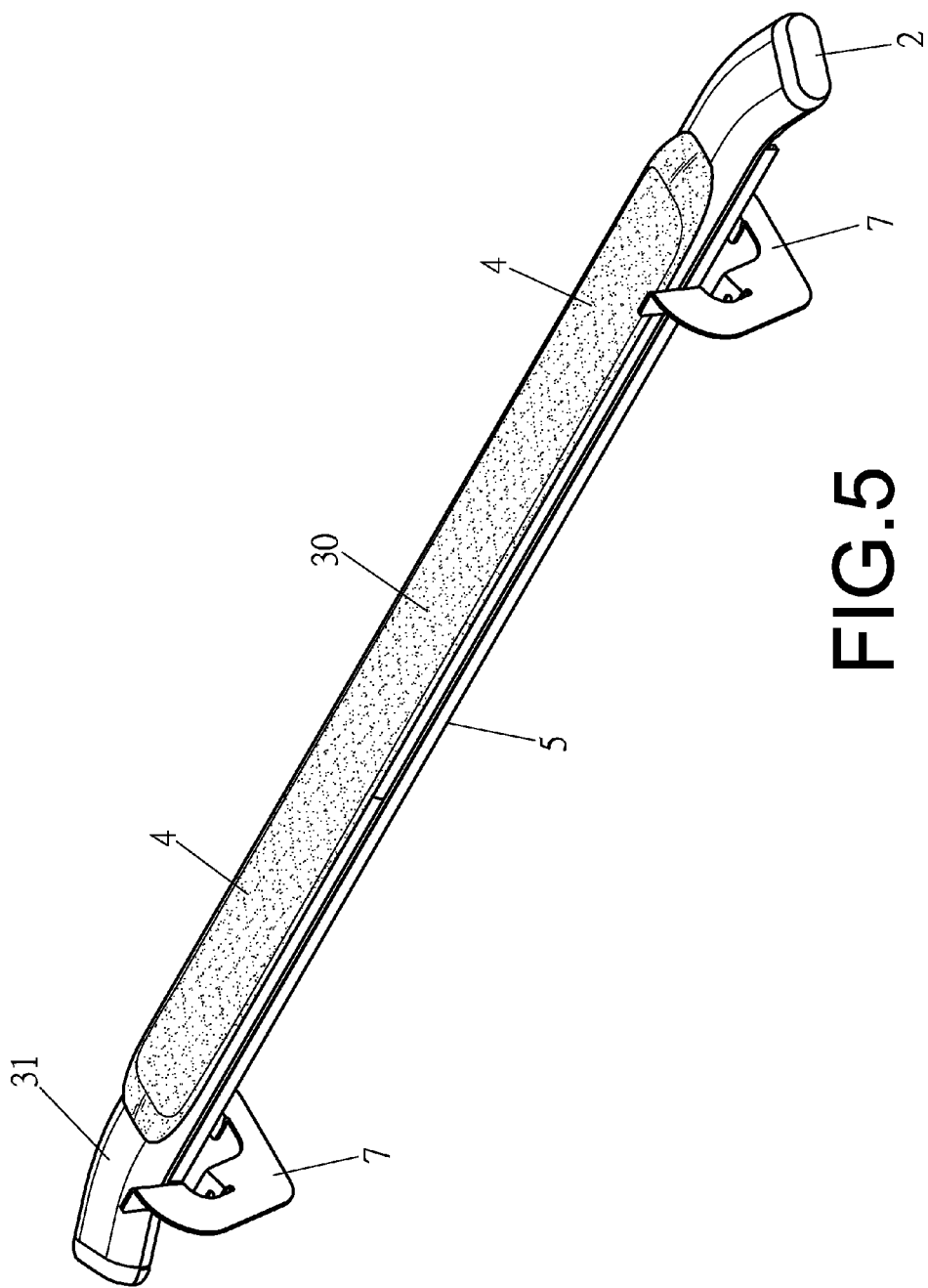
FIG. 5 is a perspective view of the vehicle running board in the present invention.
Figure 6:
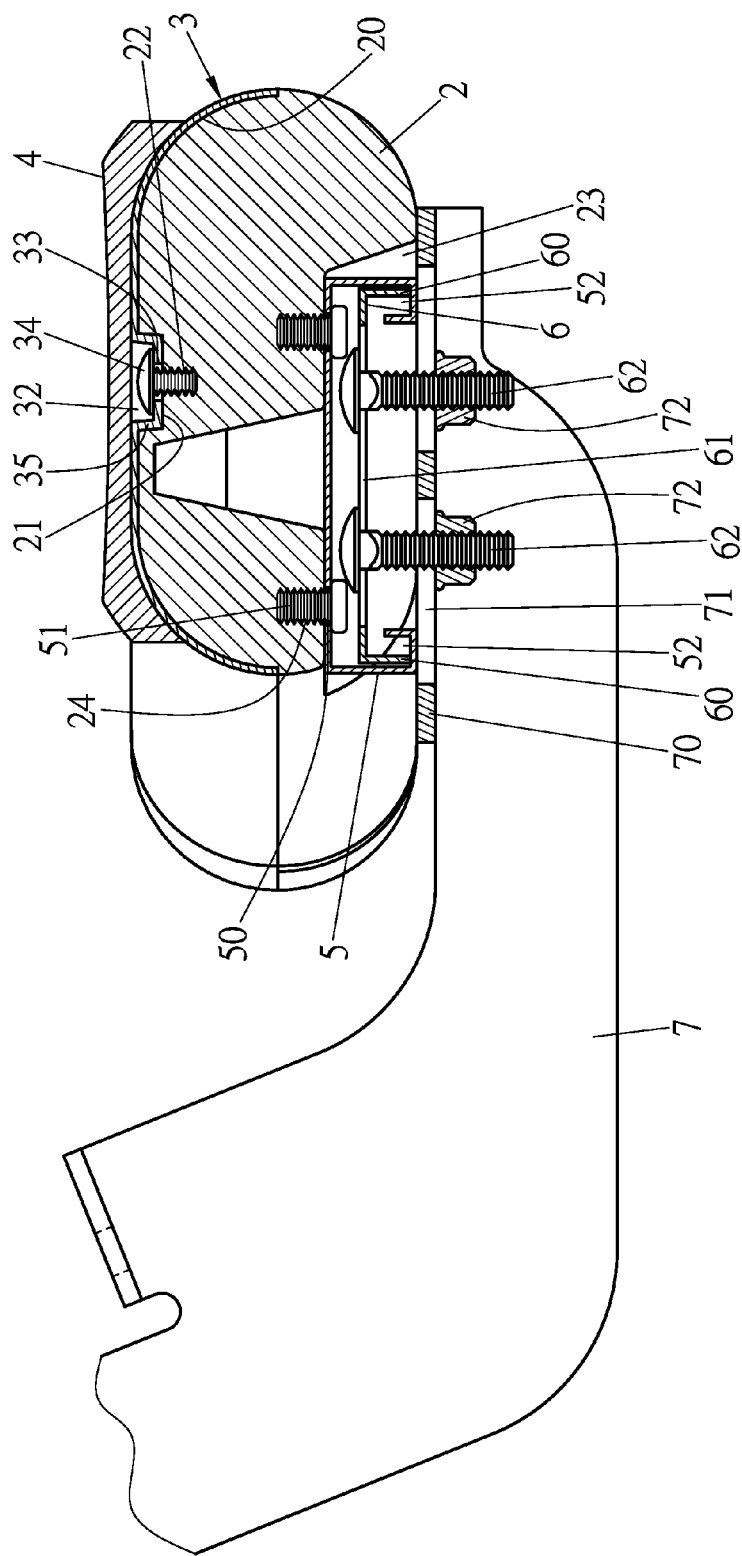
FIG. 6 is a cross-sectional view of the vehicle running board in the present invention.

A preferred embodiment of a vehicle running board in the present invention, as shown in FIGS. 3-6, includes a treadle body 2, a decorative plate 3, an anti-skid pad 4, a connecting base 5 and a plurality of positioning members 6 as main components combined together.

The treadle body 2 is formed with a recessed receiving surface 20 provided thereon with a plurality of positioning recesses 21 respectively bored with a first threaded hole 22 and has its underside disposed with a recessed chamber 23 with a plurality of second threaded holes 24.

The decorative plate 3 to be mounted on the receiving surface 20 of the treadle body 2 is composed of a long decorative plate 30 and a short decorative plate 31 joined together and respectively provided with a plurality of recesses 32 bored therein with an insert hole 33 respectively, with plural first screws 34 respectively inserted through the insert holes 33 and threadably locked in the first threaded holes 22 of the treadle body 2. The decorative plate 3 further has its underside provided with plural positioning projections 35 protruding downward at locations respectively corresponding with the recesses 32.

The anti-skid pad 4 is to be stuck on the decorative plate 3 by adhesive substance.

The connecting base 5 to be received in the recessed chamber 23 at the underside of the treadle body 2 is bored with plural insert holes 50 at locations respectively corresponding with the second threaded holes 24 in the recessed chamber 23 at the underside of the treadle body 2, having a second screw 51 inserted in each insert hole 50. The connecting base 5 further has two lower sides respectively bent downward and inward to form a sliding rail 52.

The positioning members 6 inverted-U shaped are to be set at the underside of the connecting base 5, respectively having two sides positioned in the two sliding rails 52 of the connecting base 5. Each positioning member 6 is formed with a long insert hole 61 inserted therein with two third screws 62, and the lower side of the screw head of each screw 62 is square-shaped.

In assembling, referring to FIGS. 3-6, the long decorative plate 30 and the short decorative plate 31 are first butt jointed and then assembled on the receiving surface 20 of the treadle body 2 to form an integral decorative plate 3 positioned on the treadle body 2. The decorative plate 3 can be firmly fixed on the receiving surface 20 of the treadle body 2 by having the positioning projections 35 at the undersides of the long decorative plate 30 and the short decorative plate 31 mutually engaged with the positioning recesses 21 of the treadle body 2 and also by having the first screws 34 respectively inserted through the insert holes 33 of the long decorative plate 30 and the short decorative plate 31 and then screwed in the first threaded holes 22 of the treadle body 2. Next, the anti-skid pad 4 is stuck to a proper location on the topside of the decorative plate 3 by adhesive substance and then, the connecting base 5 is combined together with the treadle body 2 by means of the second screws 51 respectively inserted through the insert holes 50 of the connecting base 5 from the underside and screwed with the second threaded holes 24 of the treadle body 2. Afterward, the third screws 62 are inserted through the long insert hole 61 of the positioning member 6 and then the positioning member 6 is assembled at the underside of the connecting base 5, letting two sides of each positioning member 6 positioned on the sliding rail 52 at two lower sides of the connecting base 5 to enable the positioning member 6 to slide and shift at the underside of the connecting base 5.

Figure 7:
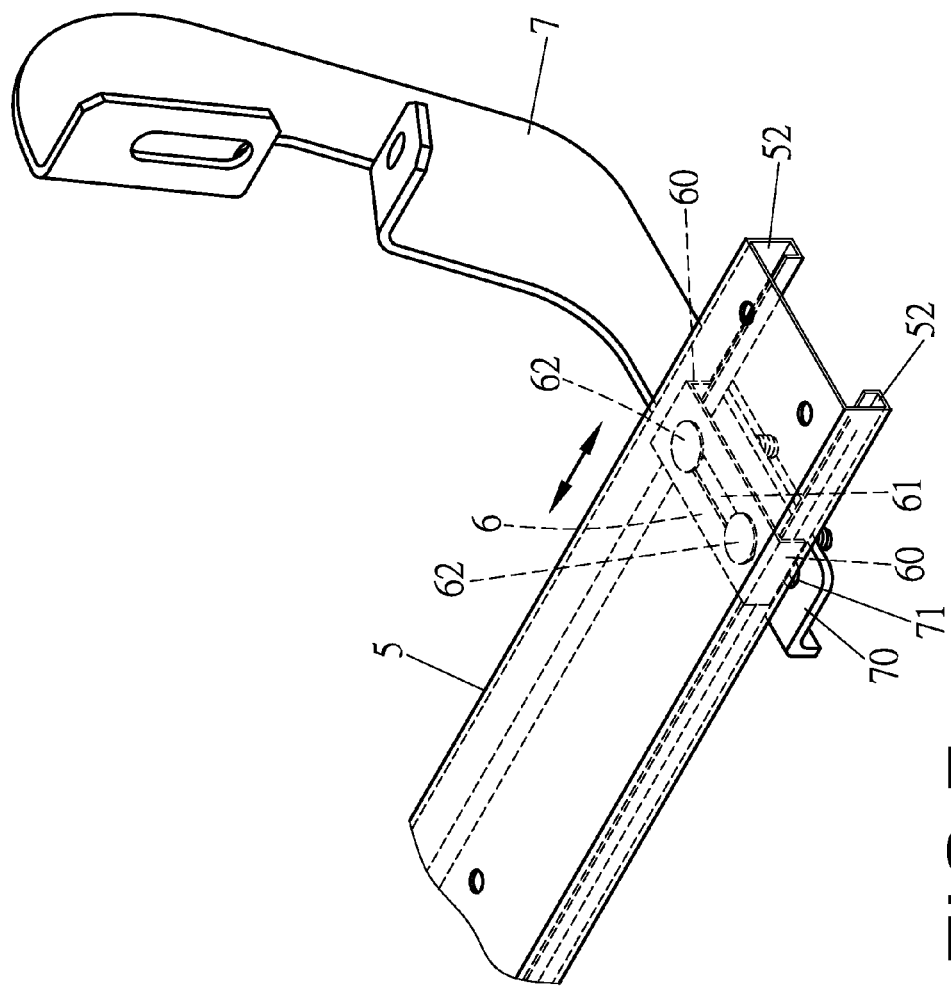
FIG. 7 is a diagrammatical view illustrating that the positioning member and the fixing base are adjusted in position on the connecting base in the present invention.

In using, have at least two fixing bases 7 respectively secured at two sides of a vehicle (not shown) on which the vehicle running board is to be assembled and then, superpose the connecting base 5 of the vehicle running board of this invention on the connecting plate 70 of the fixing base 7 and move the positioning member 6 of the connecting base 5 to have its long insert hole 61 aligned to the long insert holes 71 of the connecting plate 70 of the fixing base 7, as shown in FIG. 7. Subsequently, have the third screws 62 of the positioning member 6 inserted in the long insert holes 71 of the fixing base 7 and secured therein by nuts 72 to stably assemble the vehicle running board at one side of a vehicle. Thus, the positioning member 6 provided at the underside of the connecting base 5 can be adjusted for matching the setting position of the fixing base 7 that is secured on a vehicle, convenient in assembly and use and stable in whole structure.

While the preferred embodiment of the invention has been described above, it will be recognized and understood that various modifications will be made therein and the appended claims are intended to cover all such modifications that may fall within the spirit and scope of the invention.

What is claimed is:

1. A vehicle running board comprising a treadle body, said treadle body provided with a recessed receiving surface, said receiving surface formed with a plurality of positioning recesses respectively bored therein with a first threaded hole, said treadle body disposed with a recessed chamber at an underside, said recessed chamber bored therein with a plurality of second threaded holes, a decorative plate set on said receiving surface of said treadle body, said decorative plate composed of a long decorative plate and a short decorative plate jointed together, said long decorative plate and said short decorative plate respectively formed with a plurality of recesses respectively having an insert hole, plural first screws respectively inserted through said insert holes and threadably locked in said first threaded holes of said treadle body, said decorative plate having an underside provided with positioning projections at locations corresponding with said recesses, said positioning projections respectively engaged in said positioning recesses of said treadle body, an anti-skid pad mounted on said decorative plate, a connecting base received in said recessed chamber at the underside of said treadle body, said connecting base bored with insert holes at locations respectively corresponding with said second threaded holes in said recessed chamber at the underside of said treadle body, said insert holes respectively inserted therein with a second screw, said second screw threadably secured in said second threaded hole of said treadle body; and, wherein said connecting base has two lower sides respectively formed into a sliding rail and plural positioning members provided at an underside of said connecting base, each said positioning member being inverted-U shaped and having two sides positioned in said sliding rail of said connecting base, each said positioning member formed with a long insert hole, said long insert hole of said positioning member inserted therein with third screws.

2. The vehicle running board as claimed in claim 1, wherein a lower side of a screw head of said third screw on said positioning member is square-shaped.

* * * * *